(No Model.)

E. PAULSEN.
PLOW.

No. 487,539. Patented Dec. 6, 1892.

Witnesses:
Jesse Heller
Philip C. Masi

Inventor.
Erik Paulsen
by E. W. Anderson
his Attorney.

UNITED STATES PATENT OFFICE.

ERIK PAULSEN, OF LARCHWOOD, IOWA.

PLOW.

SPECIFICATION forming part of Letters Patent No. 487,539, dated December 6, 1892.

Application filed August 16, 1892. Serial No. 443,205. (No model.)

*To all whom it may concern:*

Be it known that I, ERIK PAULSEN, a subject of the King of Sweden and Norway, and a resident of Larchwood, in the county of Lyon and State of Iowa, have invented certain new and useful Improvements in Plows; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1:
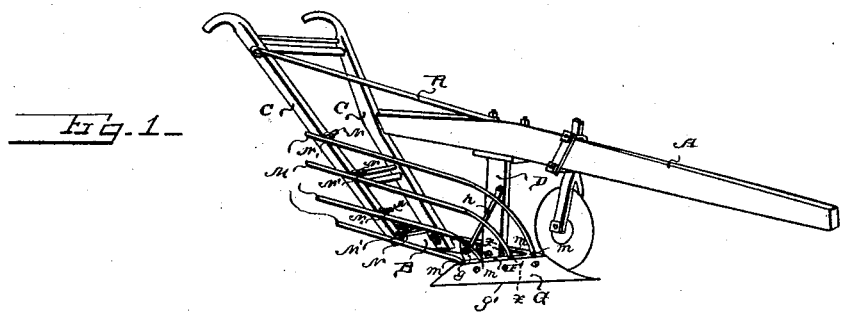
Figure 2:
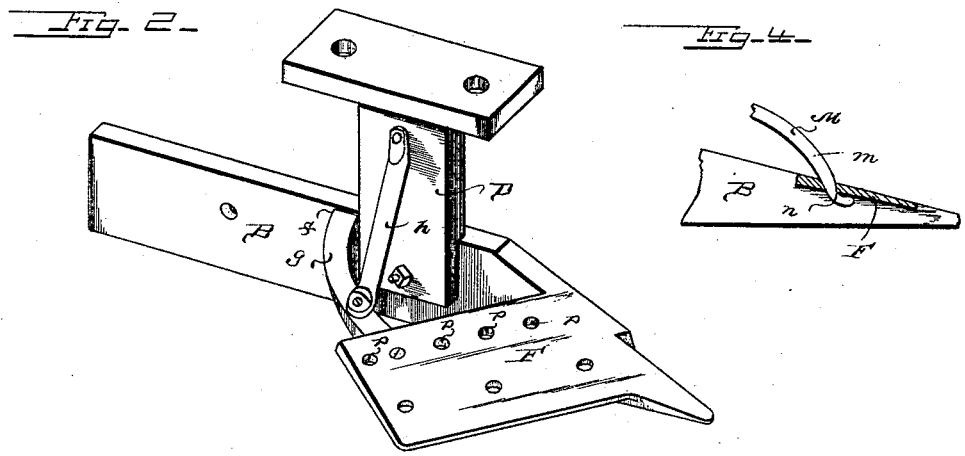
Figure 4:
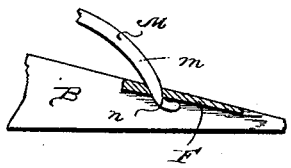
Figure 3:
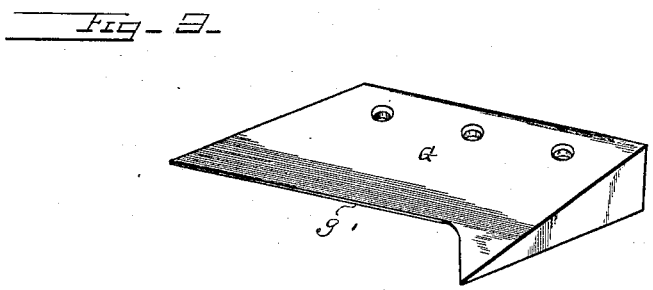

Figure 1 of the drawings is a perspective view. Fig. 2 is an enlarged perspective view showing wing-plate, beam, and attachments. Fig. 3 is an enlarged view in perspective of point and share; and Fig. 4 is a detail view in section of wing-plate, beam, and rod.

This invention has relation to certain new and useful improvements in plows, the object being to provide a plow especially adapted for breaking new ground; and the invention consists in the novel construction and combination of parts, all as hereinafter specified.

In the accompanying drawings, the letter A designates the beam, B the landside or land-bar, and C C the handles. The landside B is securely bolted to the landside-handle and to the standard D, which at its upper end is securely bolted to the beam. Integral with the forward portion of the land-bar is the projecting horizontal wing-plate F, to which the point and share G is secured. Said wing is braced by a curved bar $g$, secured thereto and to the inner face of the land-bar at $f$, and this bar $g$ is itself braced by an iron $h$, secured to said bar and to the standard D. The point and share G is made heavy with a broad cutting-edge $g'$. Said share is but slightly inclined to the horizontal.

In the rear edge of the wing-plate F, above the point where the share is attached, is a series of perforations $p$, in which are inserted the downwardly-turned ends $m$ of a series of curved rods M, which are arranged one above the other in lieu of a mold-board. Near their rear ends said rods are each formed with an inward finger or projection N, which passes through staples N' on the furrow-handle and holds the rod to place. These rods are usually made of heavy wrought-iron, and are secured at their forward ends in the perforations $p$ by clinching over their extremities, as indicated at $n$.

R is a brace connecting the furrow-handle with the beam.

The parts are all made heavy and strong, so as to adapt the plow to rough work in breaking new ground having a tough sod and filled with roots and obstructions.

Having described this invention, what I claim, and desire to secure by Letters Patent, is—

In a plow, the combination, with the land-bar B, having at its forward portion the integral-pointed horizontal wing-plate F, of the curved brace $g$, secured at one end to the under side of said wing-plate and at the other end to the land-bar, the brace $h$, connecting the brace $g$ with the standard, the series of rods forming the mold-board and secured at their forward ends to said plate, the inward integral fingers or projections N on the rear portions of said rods and engaged by staples N' on the furrow-handle, and a flat share and point secured to said wing-plate, substantially as specified.

In testimony whereof I affix my signature in presence of two witnesses.

ERIK PAULSEN.

Witnesses:
CHAS. SHADE,
JOHN JUEL.